US009768966B2

United States Patent
Krahn et al.

(10) Patent No.: US 9,768,966 B2
(45) Date of Patent: Sep. 19, 2017

(54) PEER TO PEER ATTESTATION

(71) Applicant: Google Inc., Mountain View, CA (US)

(72) Inventors: Darren David Krahn, Saratoga, CA (US); William Alexander Drewry, Nashville, TN (US); Sumit Gwalani, Mountain View, CA (US)

(73) Assignee: Google Inc., Mountain View, CA (US)

(*) Notice: Subject to any disclaimer, the term of this patent is extended or adjusted under 35 U.S.C. 154(b) by 55 days.

(21) Appl. No.: 14/821,616

(22) Filed: Aug. 7, 2015

(65) Prior Publication Data

US 2017/0041147 A1    Feb. 9, 2017

(51) Int. Cl.
*H04L 29/06*     (2006.01)
*H04L 9/32*      (2006.01)
*G06F 21/57*     (2013.01)
*H04L 9/08*      (2006.01)

(52) U.S. Cl.
CPC ............ *H04L 9/3247* (2013.01); *G06F 21/57* (2013.01); *H04L 9/0877* (2013.01); *H04L 9/0897* (2013.01); *H04L 9/3234* (2013.01); *H04L 9/3268* (2013.01); *H04L 63/0823* (2013.01); *H04L 63/123* (2013.01); *H04L 63/0428* (2013.01)

(58) Field of Classification Search
None
See application file for complete search history.

(56) References Cited

U.S. PATENT DOCUMENTS

| | | | |
|---|---|---|---|
| 2005/0144440 A1 | 6/2005 | Catherman et al. | |
| 2005/0188193 A1* | 8/2005 | Kuehnel | G06F 21/445 713/155 |
| 2005/0216736 A1* | 9/2005 | Smith | H04L 63/166 713/168 |
| 2007/0171910 A1* | 7/2007 | Kumar | H04L 63/0428 370/392 |
| 2008/0320308 A1 | 12/2008 | Kostiainen et al. | |
| 2009/0013181 A1 | 1/2009 | Choi et al. | |
| 2009/0043681 A1* | 2/2009 | Shoji | G06F 21/335 705/35 |
| 2009/0077643 A1* | 3/2009 | Schmidt | H04W 8/265 726/6 |
| 2009/0259850 A1* | 10/2009 | Ishibashi | H04L 9/3273 713/169 |

(Continued)

*Primary Examiner* — Malcolm Cribbs
(74) *Attorney, Agent, or Firm* — McDermott Will & Emery LLP

(57) ABSTRACT

Techniques for peer to peer attestation are provided. An example method includes receiving, at a first device, a discovery message from a second device, based on the discovery message, establishing a communication channel between the first device and the second device, receiving, at the first device, identity information from the second device, the identity information including one or more of: a trusted platform module (TPM) endorsement key certificate, a public portion of an identity key, one or more platform control register (PCR) values or a quote of the PCR values with the identity key, verifying, at the first device, one or more of the PCR values, the quote or the endorsement key certificate and authenticating one or more of the communication channel or the identity information of the second device based on the verification of a signature received from the second device.

20 Claims, 7 Drawing Sheets

(56) References Cited

U.S. PATENT DOCUMENTS

| | | | |
|---|---|---|---|
| 2011/0099367 A1* | 4/2011 | Thom | H04L 9/0877 |
| | | | 713/156 |
| 2015/0043545 A1* | 2/2015 | Cheng | H04W 56/00 |
| | | | 370/336 |
| 2015/0229475 A1* | 8/2015 | Benoit | H04L 9/14 |
| | | | 713/168 |
| 2015/0319160 A1* | 11/2015 | Ferguson | H04L 9/3247 |
| | | | 726/10 |

* cited by examiner

PEER TO PEER ATTESTATION

BACKGROUND

The present disclosure relates generally to attestation in trusted computing.

SUMMARY

The disclosed subject matter relates to peer to peer attestation.

In some innovative implementations, the disclosed subject matter can be embodied in a method. The method comprises receiving, at a first device, a discovery message from a second device, based on the discovery message, establishing a communication channel between the first device and the second device, receiving, at the first device, identity information from the second device, the identity information including one or more of: a trusted platform module (TPM) endorsement key certificate, a public portion of an identity key, one or more platform configuration register (PCR) values or a quote of the PCR values with the identity key, verifying, at the first device, one or more of the PCR values, the quote or the endorsement key certificate, and based on the verification, sending, from the first device to the second device, a message including a signing key, where the signing key includes a random value generated by the first device, encrypting, at the first device with an endorsement public key, a combination of the signing key and information associated with the identity key, providing the encrypted combination from the first device to the second device, when a response is received from the second device at the first device after the providing, verifying a signature included in the response, and authenticating one or more of the communication channel or the identity information of the second device based on the verification of the signature.

In some innovative implementations, the disclosed subject matter can be embodied in a machine readable medium. The machine readable medium includes instructions, which when executed by a processor, cause the processor to perform operations comprising receiving, at a first device, a discovery message from a second device, based on the discovery message, establishing a communication channel between the first device and the second device, receiving, at the first device, identity information from the second device, the identity information including one or more of: a trusted platform module (TPM) endorsement key certificate, a public portion of an identity key, one or more platform control register (PCR) values or a quote of the PCR values with the identity key, verifying, at the first device, one or more of the PCR values, the quote or the endorsement key certificate, and based on the verification, sending, from the first device to the second device, a message including connectivity information associated with the established communication channel, encrypting, at the first device with an endorsement public key, a combination of the connectivity information and information associated with the identity key, providing the encrypted combination from the first device to the second device, when a response is received from the second device at the first device after the providing, verifying a signature included in the response, and authenticating one or more of the communication channel or the identity information of the second device based on the verification.

In some innovative implementations, the disclosed subject matter can be embodied in a system. The system comprises a memory comprising instructions and a processor configured to execute the instructions to receive, at a first device, a discovery message from a second device, based on the discovery message, establish a communication channel between the first device and the second device, receive, at the first device, identity information from the second device, the identity information including one or more of: a trusted platform module (TPM) endorsement key certificate, a public portion of an identity key, one or more platform control register (PCR) values, public portion of an asymmetric signing key, signature of the public portion of the asymmetric signing key by the identity key, or a quote of the PCR values with the identity key, verify, at the first device, certification of the asymmetric signing key, based on the verification, send, from the first device to the second device, a message including a signing key, where the signing key includes a random value generated by the first device, encrypt, at the first device with an endorsement public key, a combination of the signing key and information associated with the identity key, provide the encrypted combination from the first device to the second device, when a response is received from the second device at the first device after the providing, verify a signature included in the response, and authenticate one or more of the communication channel or the identity information of the second device based on the verification of the signature.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the accompanying figures summarized below.

DETAILED DESCRIPTION

Figure 1:
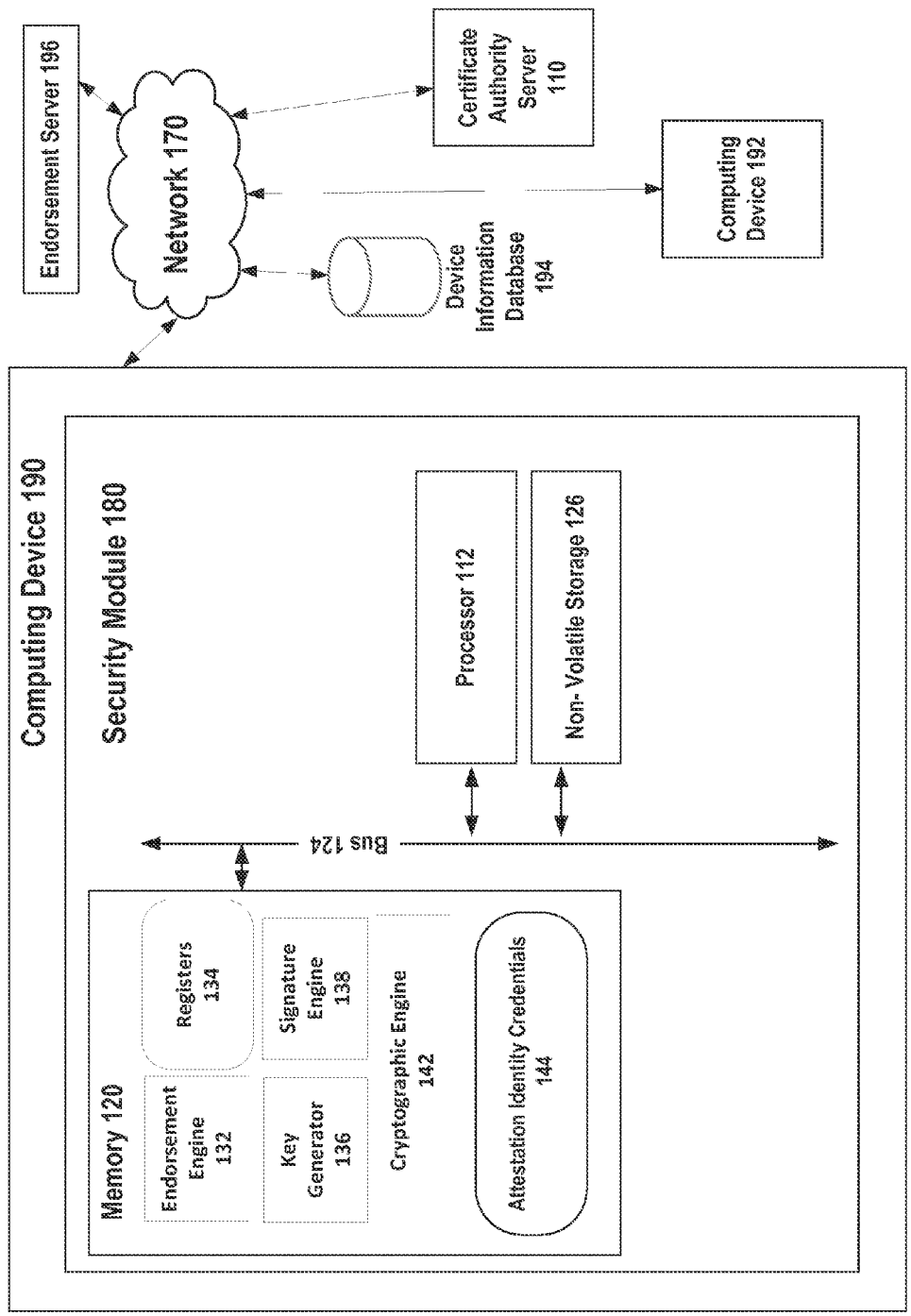
FIG. 1 is a diagram of an example device and network environment suitable for practicing some implementations of the subject technology.

The detailed description set forth below is intended as a description of various configurations of the subject technology and is not intended to represent the only configurations in which the subject technology may be practiced. The appended drawings are incorporated herein and constitute a part of the detailed description. The subject technology is not limited to the specific details set forth herein and may be practiced without these specific details.

A trusted platform can be a computing platform that has a trusted component, in the form of a security module, which the trusted platform uses to create a foundation of trust for software processes. An example of such a security module is a Trusted Platform Module, or TPM. The TPM is typically implemented as a tamper resistant integrated circuit (IC) on a computing device. The TPM may be associated with firmware (e.g., Basic Input/Output System (BIOS) firmware) that allows the computing device to represent itself as a trusted platform.

Endorsement of legitimacy of a computing device including a security module (e.g., a TPM) typically involves an endorsement authority embedding an endorsement key (e.g., software certification such as an asymmetric key pair and a certificate for the corresponding public key) in the security module at the time of manufacture. In some cases, the endorsement key may include coarse information regarding a manufacturer of the computing device or the security module. In other cases, the endorsement key may include information regarding a type of a product (e.g., laptop or cell-phone). A hardware device made by a particular manufacturer may be able to prove (or attest) to a server that it is a legitimate product of the particular manufacturer. The hardware device may also be able to operate in a particular mode, inform the server what kind of product the hardware device is (e.g., laptop, audio speaker, network router, etc.) and the particular mode the hardware device is in. Such attestation may require an Internet connection and access to the appropriate software services provided by the manufacturer. However, this approach may not be sufficient for some use cases, particularly when the Internet connection may not be available. For example, the hardware device may want to share WiFi credentials via Bluetooth but may only want to share such credentials with legitimate or attested devices that meet certain characteristics. In another example, multiple devices of a particular type may want to coordinate with each other if they are in proximity.

The disclosed embodiments enable peer to peer attestation between two or more devices (e.g., a first device and a second device). For example, at a first device, a discovery message is received from the second device. Based on the discovery message, a communication channel may be established between the first device and the second device. At the first device, identity information may be received from the second device. The identity information may include, but is not limited to, one or more of: a trusted platform module (TPM) endorsement key certificate, a public portion of an identity key, one or more platform control register (PCR) values or a quote of the KR values with the identity key.

The first device may then verify one or more of the PCR values, the quote or the endorsement key certificate. Based on the verification, the first device may send to the second device, a message including a signing key, where the signing key includes a random value generated by the first device. The first device may also encrypt, with an endorsement public key, a combination of the signing key and information associated with the identity key. The first device may then provide the encrypted combination to the second device.

When a response is received from the second device at the first device after the encrypted combination is provided to the second device, the first device may verify a signature included in the response. When the signature is verified, the first device authenticates one or more of the communication channel or the identity information of the second device based on the verification of the signature.

In this way, a first device and a second device may be able to attest their identity to each via a peer to peer approach even when an Internet (or similar) connection may not be available. For example, the hardware device may be able to share WiFi credentials via Bluetooth with legitimate or attested devices that meet certain characteristics. In another example, multiple devices of a particular type may be able to coordinate with each other if they are in proximity. The disclosed implementations are not limited to two devices and may work with any number of devices and any type of wired or wireless networks.

Some aspects of the subject technology include storing information regarding computing device hardware. A user has the option of preventing storage of such information. The user may also be provided with an opportunity to control whether programs or features collect or share such information. Thus, the user may have control over how information is collected about the computing device hardware and used by a server.

FIG. 1 is a diagram illustrating example architecture for security module endorsement according to some implementations of the subject technology. Security module 180 includes processor 112, memory 120, storage 126 and bus 124. Security module 180 may also be associated with an input/output module, input device, output device and a communications module. Memory 120 includes endorsement engine 132, registers 134, key generator 136, signature engine 138 and cryptographic engine 142.

Security module 180 may reside in computing device 190. Computing device 190 may include one or more processors, memory and storage. Computing device 190 may additionally include an output device e.g., touch screen display, non-touch screen display), input device (e.g., a keyboard, touchscreen, or mouse) to receive user input. In some implementations, computing device 190 may include one or more modules for facilitating user interaction with via a browser or a special purpose application executing on computing device 190. Computing device 190 may be implemented as a single machine with a single processor, a multi-processor machine, or a server farm including multiple machines with multiple processors. A communication module on computing device 190 can allow security module 180 (or computing device 190) to send and receive data over network 150 to device information database 194, endorsement server 196 and certificate authority server 110. It is to be appreciated that computing device 192 may also include, but is not limited to one or more of the components included in computing device 190. For example, computing device 192 may also include a security module, processor, memory, storage and bus. The security module may also be associated with an input/output module, input device, output device and a communications module. The memory of computing device 192 may also include and endorsement engine, registers, key generator, signature engine and a cryptographic engine.

In some implementations, security module 180 may be associated with a device information database 194. Device information database 19 may include data identifying devices and characteristics of the devices. Identification may be a number, alphanumeric string, hash value or any other form of identification. The devices may include, but are not limited to, laptops, mobile devices, tablet computers, home automation devices and sensors, Internet enabled hardware devices, etc. The characteristics may include, but are not limited to, classes, models, or batches of devices that may be manufactured by different manufacturers. In some implementations, the devices and their respective characteristics may be associated with respective specialized endorsement credentials and extended integrity measurements. In some implementations, this information may be stored in a database table at device information database 194 and may be indexed by specialized endorsement credentials.

In some implementations, device information database 194 may identify (e.g., flag) specialized endorsement credentials and respective extended integrity measurements devices that are invalid. Security modules (e.g., security module 180) that provide such invalid credentials are not to be provided with attestation identity credentials that would attest or confirm authenticity of the security modules and thereby authenticity of computing devices on which the security modules reside. Similarly, in some implementations, device information database 194 may identify specialized endorsement credentials and respective extended integrity measurements that are valid.

In some implementations, certificate authority server 110, device information database 194, endorsement server 196, client computing device 190 (or 192) and security module 180 can communicate with one another via a network 150. Network 150 may include the Internet, an intranet, a local area network, a wide area network, a wired network, a wireless network, or a virtual private network (VPN). While only one certificate authority server 110, endorsement server 196, computing device 190, device information database 194 and security module 180 are illustrated, the subject technology may be implemented in conjunction with any number of certificate authority servers 110, client computing devices 190, device information databases 194 and security modules 180. In some non-limiting implementations, a single computing device may implement the functions of certificate authority server 110 and device information database 194 other components illustrated in FIG. 1.

Client computing device 190 and 192 can be a laptop computer, a desktop computer, a mobile phone, a personal digital assistant (PDA), a tablet computer, a netbook, a television with one or more processors embedded therein or coupled thereto, a physical machine, or a virtual machine. Client computing device 190 and 192 may each include one or more of a keyboard, a mouse, a display, or a touch screen. Client computing device 190 and 192 can each include a web application configured to display web content. Alternatively, client computing device 190 and 192 may include special-purpose applications e.g., mobile phone or tablet computer applications) for accessing web content. Security module 180 may be embedded in computing device 190 and 192 during manufacture of computing device 190 and 192.

Figure 2:
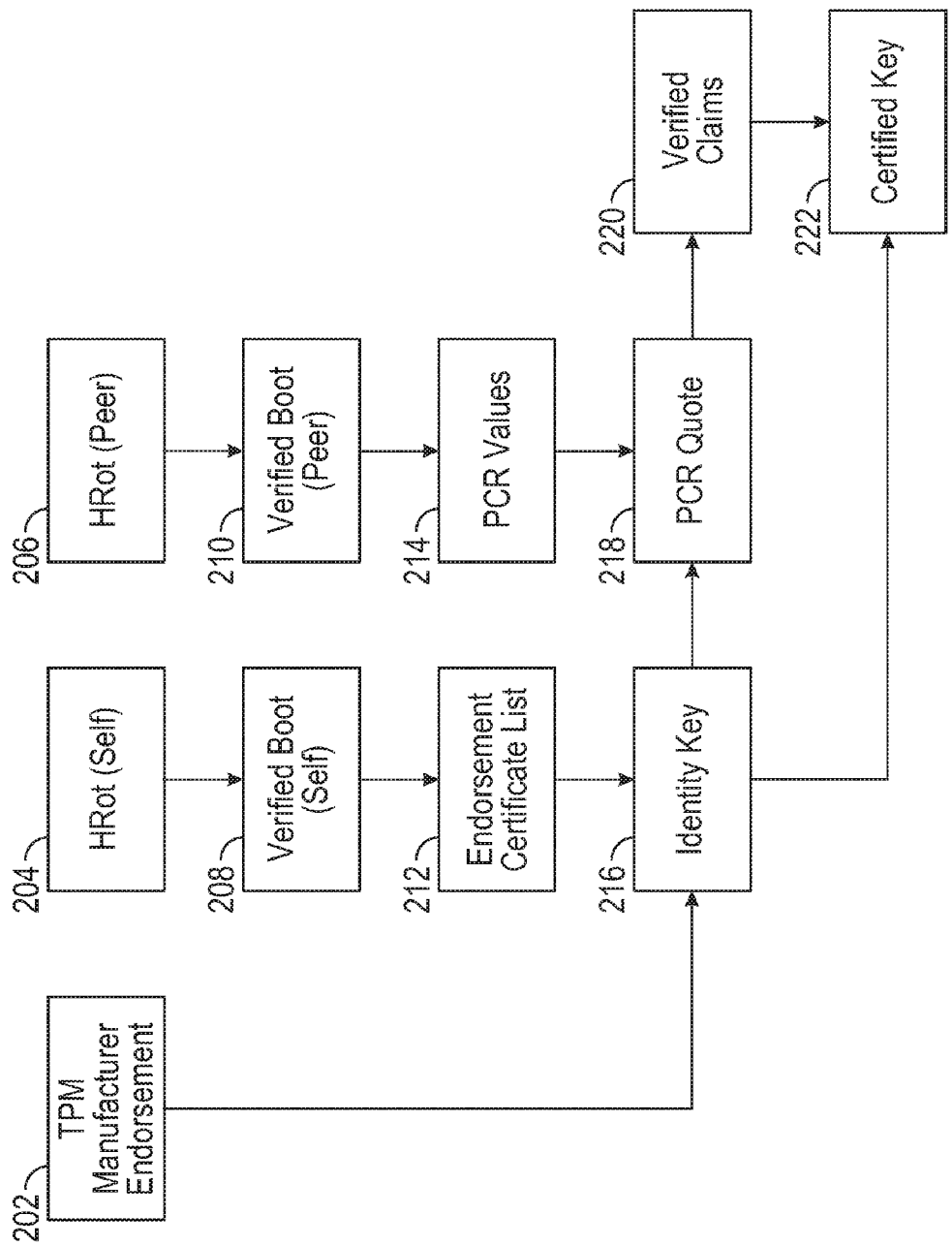
FIG. 2 illustrates an example trust graph in a peer to peer attestation system in accordance with some implementations.

In some implementations, peer to peer attestation can allow one device to prove properties about itself to another device even without internet connectivity or access to cloud computing services. A computing device may need a way to know whether it can trust claims (e.g., information or data access requests) from other devices. This trust is rooted in its own hardware root of trust (HRoT), in the HRoT of the peer device, and in the manufacturer of the peer device TPM. FIG. 2 illustrates an example trust graph depicting a flow of trust in a peer to peer attestation system in accordance with the disclosed implementations. As an example, a compromise of any single root of trust within the system implies none of the verified claims by any of the comuting devices (e.g., computing device 190 or 192) may hold any value. Also as a non-limiting example, for some computing devices it may be possible to tamper with a device HRoT with physical access, but it is not possible for it to be tampered with remotely. Referring to FIG. 2, TPM manufacturer endorsement 202 certifies that the chip was manufactured according in conformance with the TPM standard and that the chip supply chain was targeted.

Each TPM manufacturer endorses the modules they produce, HRoT (Self) 204 Read-only nonvolatile memory that holds the first instructions to execute when the device boots. HRoT (Peer) 206 can be an identical memory on the peer device. Verified Boot (Self) 208 can be a verified boot process wherein the entire system is verified based on the first executing code. Trust in verified boot is based on trust in the HRoT. Verified Boot (Peer) 210 can be an identical process on the peer device.

Endorsement certificate list 212 can be a list of endorsement certificate authority root certificates, e.g., one for each TPM product line. PCR Values 214 can be platform configuration register (PCR) values of the peer TPM as measured during boot. Each PCR value may hold information about the device (e.g. operating mode, device type, etc). Identity key 216 can be a key which can be proven to be protected by the peer TPM. PCR Quote 218 can be a signature of the PCR values by the identity key 216.

Verified claims 220 are stored when the PCR quote is verified then the claims given by the peer device (the PCR values) are verified and can be trusted (assuming the roots of trust). The certified key 222 can be an optional extension or a key certified by the peer identity key as being protected by the same peer TPM.

As discussed above, memory 120 of security module 180 can include endorsement engine 132, registers 134, key generator 136, signature engine 138, and cryptographic engine 142.

Figure 3:
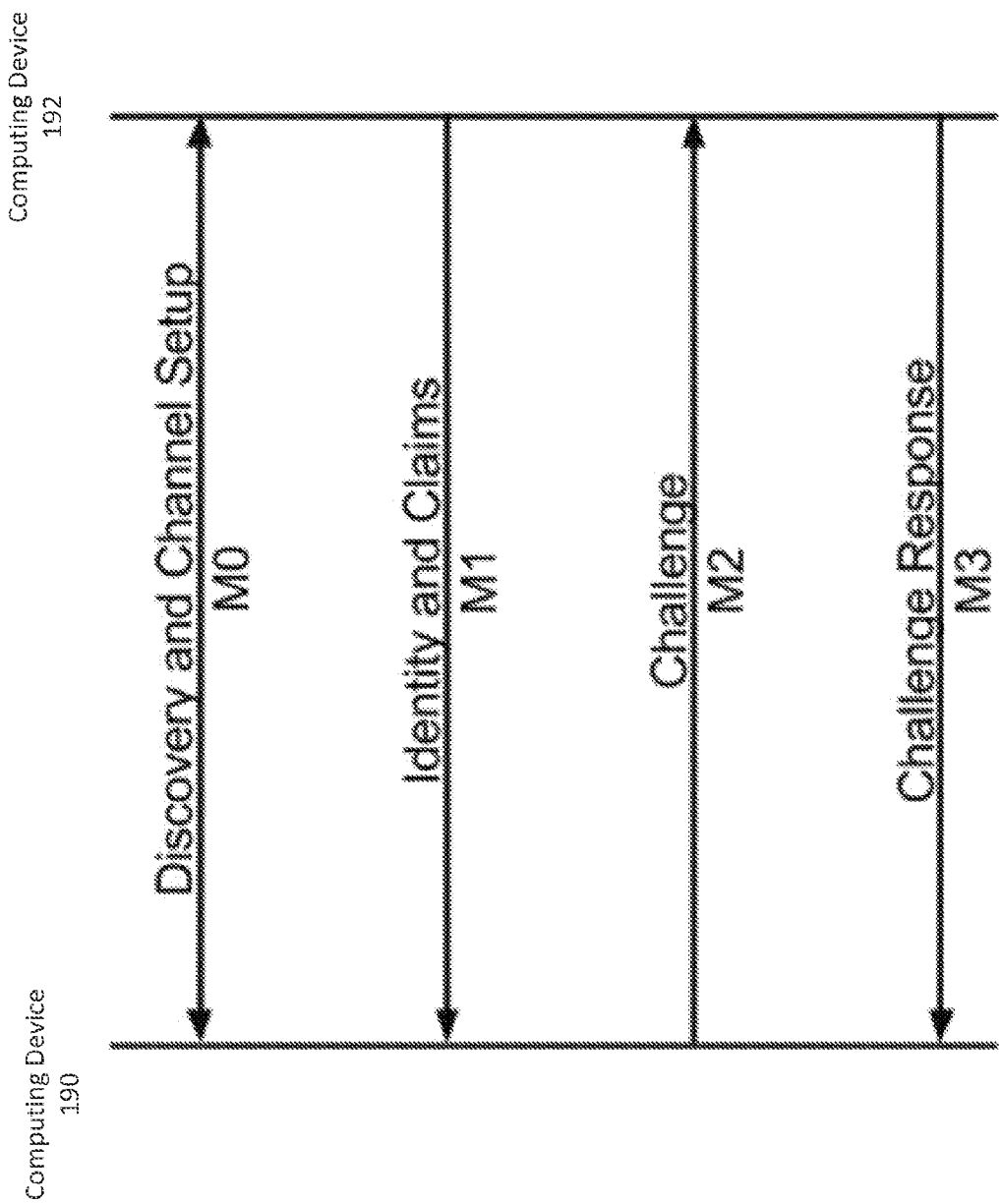
FIG. 3 illustrates an example flow diagram in accordance with some implementations.

The disclosed embodiments can enable secure channel authentication and peer to peer attestation between two or more devices (e.g., computing device 190 and computing device 192). For example, at computing device 190, a discovery message is received from computing device 192. As an example and with reference to FIG. 3, this message M0 may be the discovery message. Based on the discovery message, a communication channel may be established between computing device 190 and 192. At computing device 190 identity (or other device claims) information may be received from computing device 192. As an example and with reference to FIG. 3, message M1 may be an identity an claims message. The identity information may include, but is not limited to, one or more of: a trusted platform module (TPM) endorsement key certificate, a public portion of an identity key, one or more platform control register (PCR) values or a quote of the PCR values with the identity key.

Computing device 190 may then verify one or more of the PCR values, the quote or the endorsement key certificate. Based on the verification, computing device 190 may send to computing device 192, a message including a signing key, where the signing key includes a random value generated by computing device 192. Computing device 190 may also encrypt, with an endorsement public key, a combination of the signing key and information associated with the identity key. Computing device 190 may then provide the encrypted combination to computing device 192, Referring to FIG. 3, this encrypted combination may be included in a message that may be a "challenge" message M2.

When a response (e.g., challenge response M3 of FIG. 3) is received from computing device 192 at computing device 190 the first device after the encrypted combination is provided to computing device 192, computing device 190 may verify a signature included in the response. When the signature is verified, computing device 190 authenticates one or more of the communication channel or the identity information of the second device based on the verification of the signature.

In this way, computing device 190 and 192 may be able to attest their identity to each via a peer to peer approach even when an Internet (or similar) connection may not be available. For example, computing device 190 may be able to share WiFi credentials via Bluetooth with computing device 192. In another example, multiple devices of a particular type may be able to coordinate with each other if they are in proximity. The disclosed implementations are not limited to two devices and may work with any number of devices and any type of wired or wireless networks.

In some implementations, the TPM endorsement key certificate is provided by a manufacturer of computing device 192. In some implementations, the endorsement key certificate can be verified by computing device 190 against a list of valid endorsement root authorities stored at computing device 190. The combination may be a data structure readable by a TPM at client computing device 190 or 192. In some implementations, the signing key can be recovered from the encrypted combination by computing device 192 when a TPM of computing device 192 includes private keys for the endorsement public key and the identity key. In some implementations, the response is received from computing device 192 when computing device 192 is able to recover the signing key from the encrypted combination. In some implementations, the response from computing device 192 includes the signature of the encrypted combination using the signing key.

In some implementations, WiFi (or other wireless or wired) connectivity data may be used for peer to peer attestation or attestation between computing device 190 and 192. In some implementations, computing device 190, a discovery message (e.g., message M0 of FIG. 4) is received from computing device 192. Based on the discovery message, a communication channel may be established between computing device 190 and 192. At computing device 190 identity information (e.g., message M1 of FIG. 4) may be received from computing device 192. The identity information may include, but is not limited to, one or more of: a trusted platform module (TPM) endorsement key certificate, a public portion of an identity key, one or more platform control register (PCR) values or a quote of the PCR values with the identity key.

Figure 4:
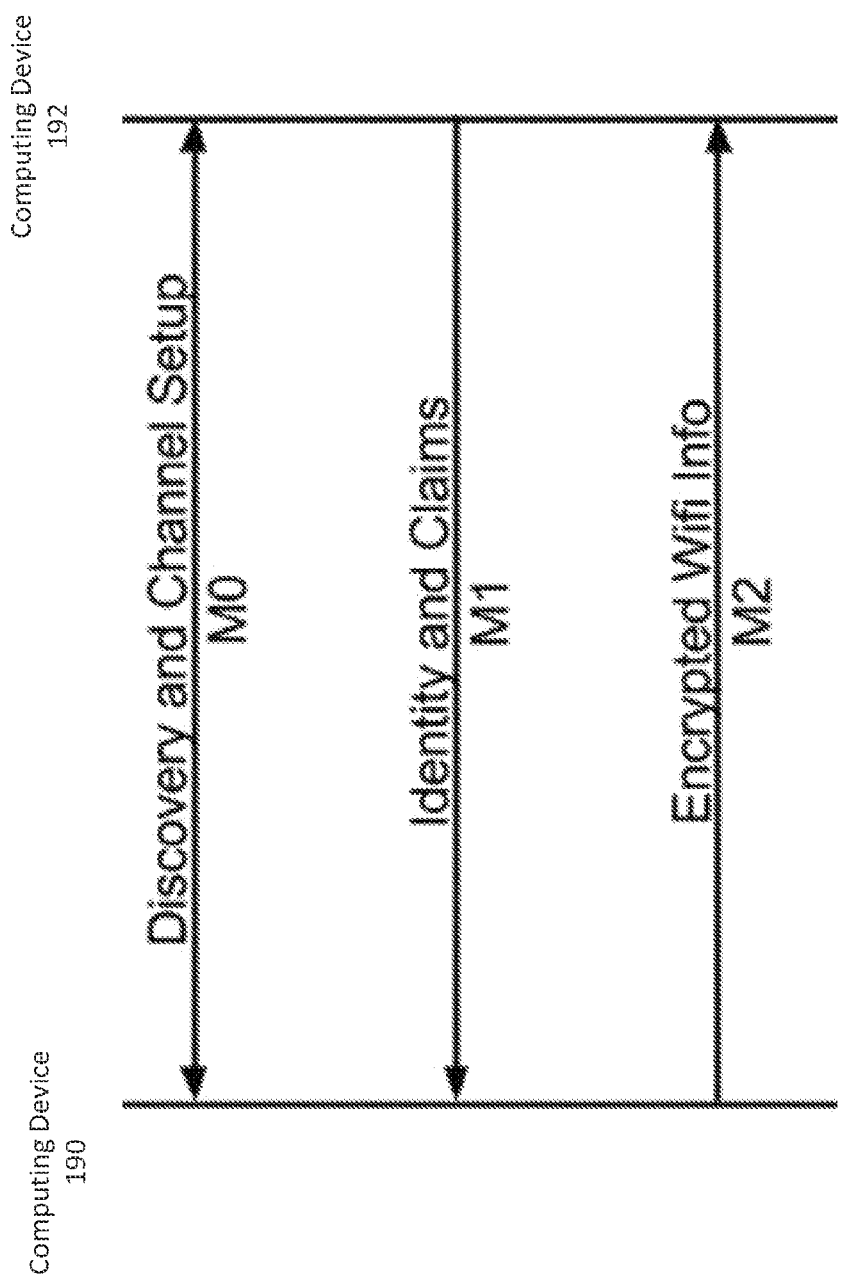
FIG. 4 illustrates another example flow diagram in accordance with some implementations.

Computing device 190 may then verify one or more of the PCR values, the quote or the endorsement key certificate. Based on the verification, computing device 190 may send to computing device 192, a message including connectivity information (e.g., WiFi connectivity information) associated with the established communication channel. Computing device 190 may also encrypt, with an endorsement public key, a combination of the connectivity information and information associated with the identity key. Computing device 190 may then provide the encrypted combination to computing device 192. Referring to FIG. 4, this encrypted combination may be included in a message that may be a "challenge" message M2.

When a response is received from computing device 192 at computing device 190 the first device after the encrypted combination is provided to computing device 192, computing device 190 may verify a signature included in the response. When the signature is verified, computing device 190 authenticates one or more of the communication channel or the identity information of the second device based on the verification of the signature.

In this way, computing device 190 and 192 may be able to attest their identity to each via a peer to peer approach even when an Internet (or similar) connection may not be available.

For example, computing device 190 may be able to share WiFi credentials via Bluetooth with computing device 192. In another example, multiple devices of a particular type may be able to coordinate with each other if they are in proximity. The disclosed implementations are not limited to two devices and may work with any number of devices and any type of wired or wireless networks.

In some implementations, the disclosed aspects may be used for device pairing between computing device 190 and 192. In some implementations, computing device 190, a discovery message is received from computing device 192. Based on the discovery message, a communication channel may be established between computing device 190 and 192. At computing device 190 identity information may be received from computing device 192. The identity information may include, but is not limited to, one or more of: a trusted platform module (TPM) endorsement key certificate, a public portion of an identity key, one or more platform control register (PCR) values, public portion of an asymmetric signing key, signature of the public portion of the asymmetric signing key by the identity key, or a quote of the PCR values with the identity key.

Computing device 190 may verify certification of the asymmetric signing key. Based on the verification or if the certification is verified, computing device 190 may send to computing device 192, a message including connectivity information (e.g., WiFi connectivity information) associated with the established communication channel. Computing device 190 may also encrypt, with an endorsement public key, a combination of the connectivity information and information associated with the identity key. Computing device 190 may then provide the encrypted combination to computing device 192.

When a response is received from computing device 192 at computing device 190 the first device after the encrypted combination is provided to computing device 192, computing device 190 may verify a signature included in the response. When the signature is verified, computing device 190 authenticates one or more of the communication channel or the identity information of the second device based on the verification of the signature.

In this way, computing device 190 and 192 may be able to attest their identity to each via a peer to peer approach even when an Internet (or similar) connection may not be available.

In some implementations, during a boot process, security module 180 may measure (e.g., generate hashes) of one or more software and firmware components, including a BIOS, boot loader, and operating system kernel of computing device 190, before they are loaded into memory of computing device 190. By making these integrity measurements before the software and firmware components execute and storing them on security module 180, the measurements may be isolated and secured from subsequent modification attempts. The integrity measurements may be stored by security module 180 in registers 134.

In some implementations, the information characterizing computing device 190 can include a hardware identifier. The hardware identifier may identify one or more of a batch, model or class of the computing device. The hardware identification may be a number, alphanumeric string, hash value or any other form of identification. The hardware identifier may be stored in secure storage (e.g., storage 126) during manufacture of computing device 190. The secure storage can be for example, a non-volatile random access memory (NVRAM) index. In some implementations, access to the secure storage is based on one or more of a cryptographic key or a present operational state of the computing device 190.

In some implementations, signature engine 138 may digitally sign integrity measurements with a digital signature. In some implementations, the digital signature may be a hash or cryptographic value generated by cryptographic engine 142.

In some implementations, endorsement engine 132 can provide, in a request for an attestation identity credential, specialized endorsement credential 148 to a certificate authority server 110, and receive, from certificate authority server 110, attestation identity credential 144. Receipt of attestation identity credential 144 can indicate to security module 180 and computing device 190 that security module 180 is authentic. When a security module is authenticated, the security module may be trusted and used by software processes on the computing device to, for example, store passwords, digital credentials, sensitive data and any other data associated with the software processes.

Figure 5:
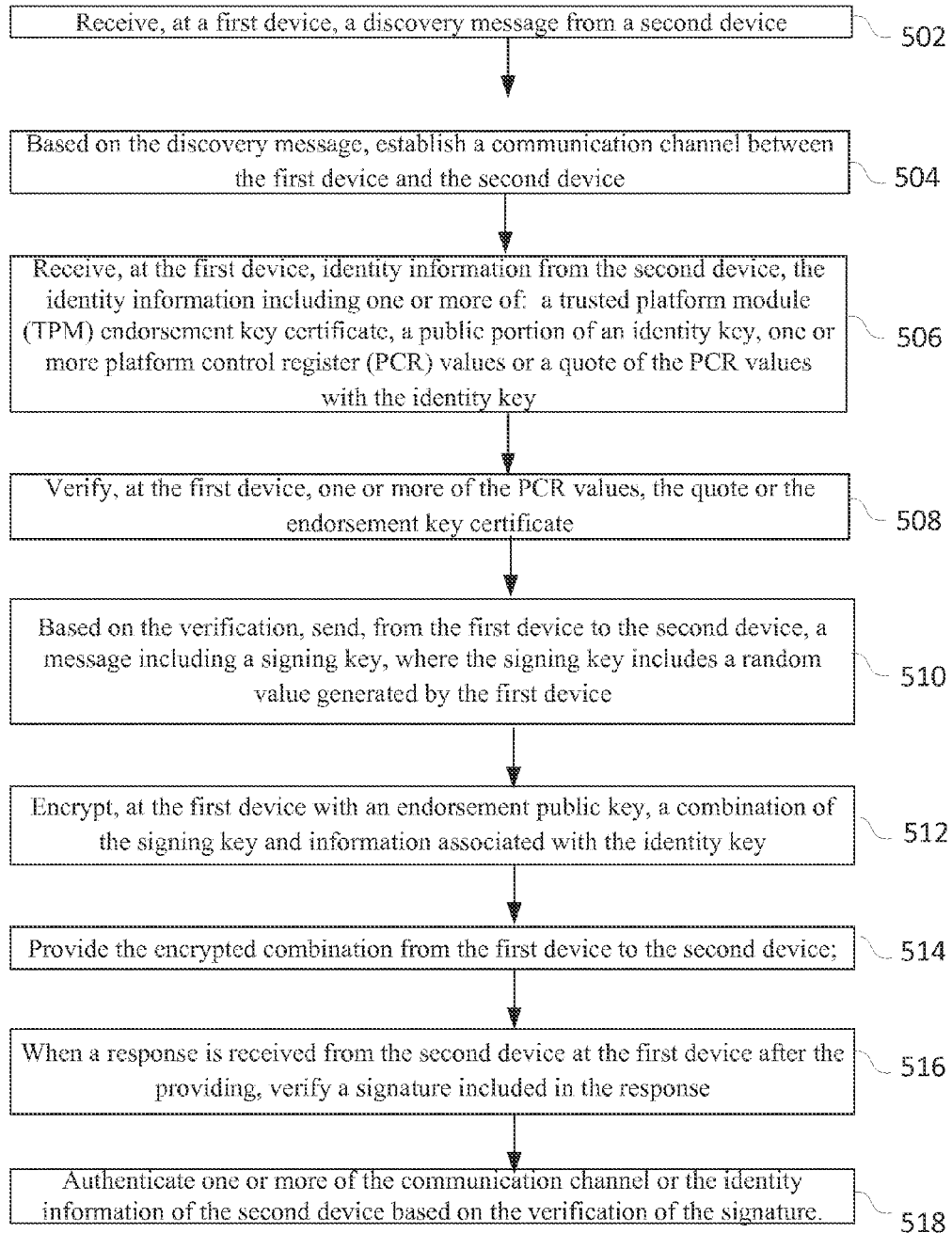
FIG. 5 is an example process for practicing implementations of the subject technology using the example device of FIG. 1

FIG. 5 is an example process 500 for practicing implementations of the subject technology using the example architecture of FIG. 1. Although FIG. 5 is described with reference to the elements of FIG. 1, the process of FIG. 5 is not limited to such and can be applied within other systems.

Process 500 begins with stage 502 when at a first device a discovery message is received from the second device. Based on the discovery message, a communication channel may be established between the first device and the second device (stage 504). At the first device, identity information may be received from the second device over the established communication channel (stage 506). The identity information may include, but is not limited to, one or more of: a trusted platform module (TPM) endorsement key certificate, a public portion of an identity key, one or more platform control register (PCR) values or a quote of the PCR values with the identity key.

The first device may then verify one or more of the PCR values, the quote or the endorsement key certificate (stage 508). Based on the verification, the first device may send to the second device, a message including a signing key, where the signing key includes a random value generated by the first device (stage 510). The first device may also encrypt, with an endorsement public key, a combination of the signing key and information associated with the identity key (stage 512). The first device may then provide the encrypted combination to the second device (stage 514).

When a response is received from the second device at the first device after the encrypted combination is provided to the second device, the first device may verify a signature included in the response (stage 516). When the signature is verified, the first device authenticates one or more of the communication channel or the identity information of the second device based on the verification of the signature (stage 518).

Figure 6:
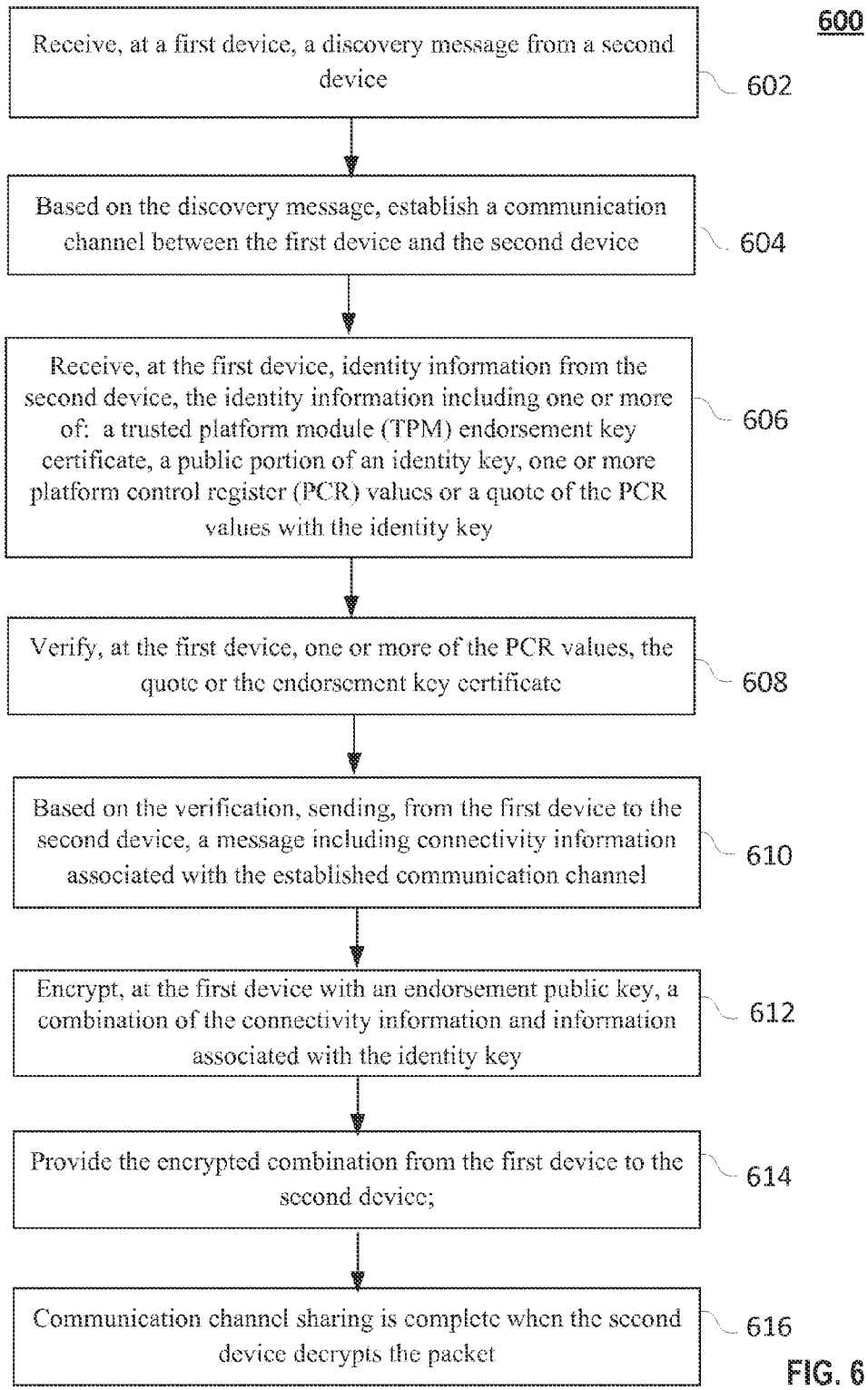
FIG. 6 illustrates another example process for practicing implementations of the subject technology using the example device of FIG. 1.

FIG. 6 is an example process 600 for practicing implementations of the subject technology using the example architecture of FIG. 1. Although FIG. 6 is described with reference to the elements of FIG. 1, the process of FIG. 6 is not limited to such and can be applied within other systems.

Process 600 begins with stage 602 when at a first device, a discovery message is received from the second device. Based on the discovery message, a communication channel may be established between the first device and the second device (stage 604). At the first device, identity information may be received from the second device over the established communication channel (stage 606). The identity information may include, but is not limited to, one or more of: a trusted platform module (TPM) endorsement key certificate, a public portion of an identity key, one or more platform control register (PCP) values or a quote of the PCR values with the identity key.

The first device may then verify one or more of the PCR values, the quote or the endorsement key certificate (stage 608). Based on the verification, the first device may send to the second device, a message including connectivity information associated with the established communication channel (stage 610). The first device may also encrypt, with an endorsement public key, a combination of the connectivity information and information associated with the identity key (stage 612). The first device may then provide the encrypted combination to the second device (stage 614).

Communication channel (e.g., WiFi) sharing is complete when the second device decrypts the packet (stage 616).

Figure 7:
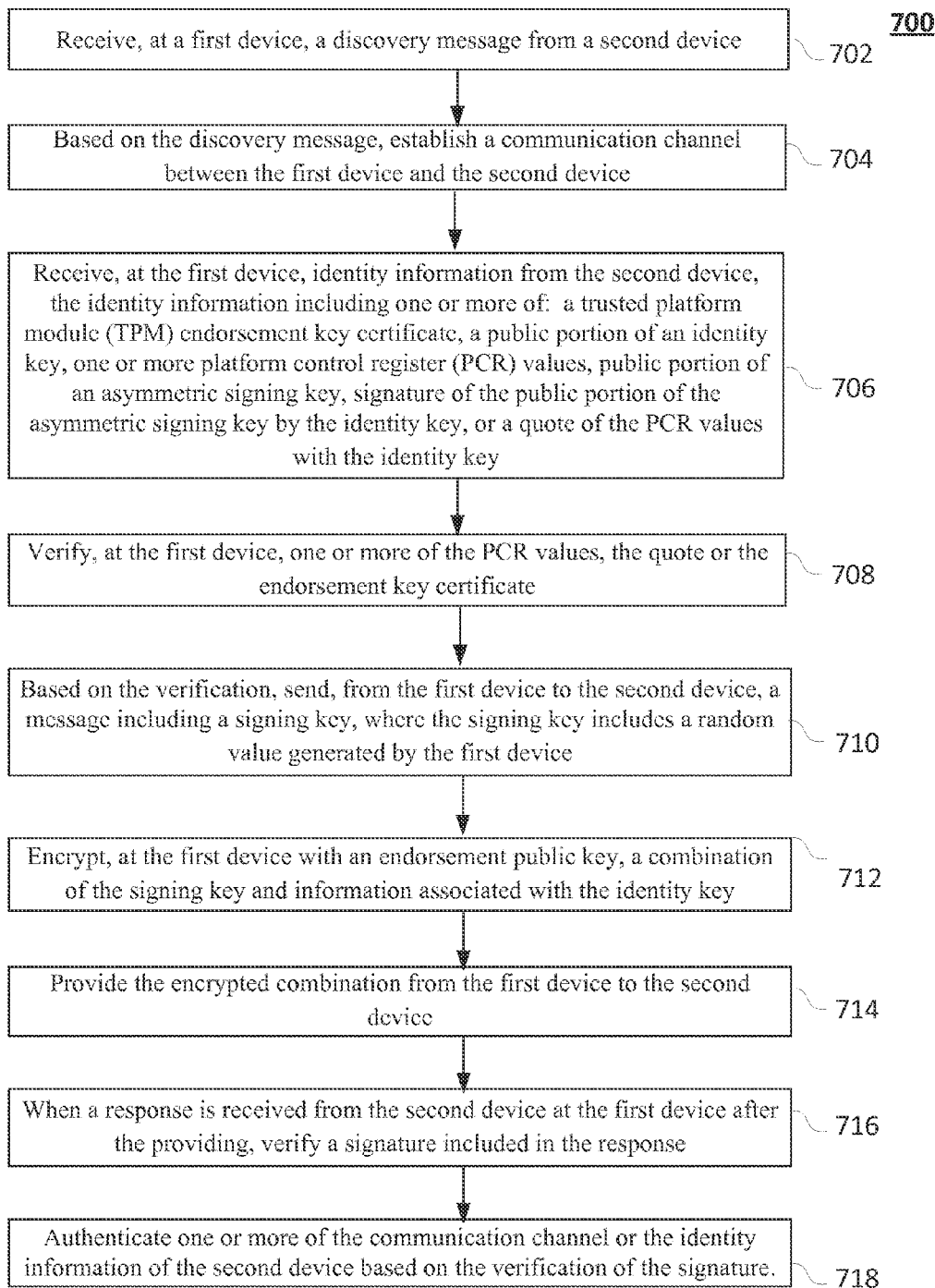
FIG. 7 illustrates yet another example process for practicing implementations of the subject technology using the example device of FIG. 1.

FIG. 7 is an example process 700 for practicing implementations of the subject technology using the example device of FIG. 1. Although FIG. 7 is described with reference to the elements of FIG. 1, the process of FIG. 7 is not limited to such and can be applied within other systems.

Process 700 begins with stage 702 when at a first device, a discovery message is received from the second device. Based on the discovery message, a communication channel may be established between the first device and the second device (stage 704). At the first device, identity information may be received from the second device over the established communication channel (stage 706). The identity information may include, but is not limited to, one or more of a trusted platform module (TPM) endorsement key certificate, a public portion of an identity key, one or more platform control register (PCR) values, public portion of an asymmetric signing key, signature of the public portion of the asymmetric signing key by the identity key, or a quote of the PCR values with the identity key.

The first device may then verify certification of the assymentric signing key (stage 708). Based on the verification, the first device may send to the second device, a message optionally including connectivity information associated with the established communication channel (stage 710). The first device may also encrypt, with an endorsement public key, a combination of the signing key and information associated with the identity key (stage 712). The first device may then provide the encrypted combination to the second device (stage 714).

When a response is received from the second device at the first device after the encrypted combination is provided to the second device, the first device may verify a signature included in the response (stage 716). When the signature is verified, the first device authenticates one or more of the communication channel or the identity information of the second device based on the verification of the signature (stage 718).

Returning to FIG. 1, in certain aspects, security module 180 may be implemented using hardware or a combination of software and hardware, either in a dedicated server, computing device or integrated into another entity, or distributed across multiple entities.

Security module 180 includes a bus 124 or other communication mechanism for communicating information, and processor 112 coupled with bus 124 for processing information. Processor 112 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Security module 180 can include, in addition to hardware, code that creates an execution environment for the computer program in question, e.g., code that constitutes processor firmware, a protocol stack, a database management system, an operating system, or a combination of one or more of them stored in memory 120. Memory 120 may include Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 124 for storing information and instructions to be executed by processor 112. The processor 112 and the memory 120 can be supplemented by, or incorporated in, special purpose logic circuitry.

The instructions may be stored in the memory 120 and implemented in one or more computer program products, i.e., one or more modules of computer program instructions encoded on a computer readable medium for execution by, or to control the operation of, security module 180, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 120 may also be used for storing temporary variable or other intermediate information during execution of instructions to be executed by processor 112.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Security module 180 further includes a data storage device 126 such as a magnetic disk or optical disk, solid state memory, non-volatile memory, etc. coupled to bus 124 for storing information and instructions. Client 190 may be coupled via an input/output module to various devices. The input/output module can be any input/output module. Example input/output modules include data ports such as USB ports. The input/output module can be configured to connect to a communications module. Example communications modules include networking interface cards, such as Ethernet cards and modems. In certain aspects, the input/output module is configured to connect to a plurality of devices, such as an input device and/or an output device. Example input devices include a keyboard and a pointing device, e.g., a mouse or a trackball, by which a user can provide input to the client computing device 190 and security module 180. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices include display devices, such as a LED (light emitting diode), CRT (cathode ray tube), or LCD (liquid crystal display) screen, for displaying information to the user.

According to one aspect of the present disclosure, security module 180 can be implemented in client computing device 190 in response to processor 112 executing one or more sequences of one or more instructions contained in memory 120. Such instructions may be read into memory 120 from another machine-readable medium, such as storage device 126. Execution of the sequences of instructions contained in main memory 120 causes processor 112 to perform the process blocks described herein. One or more processors in a multi-processing arrangement may also be employed to execute the sequences of instructions contained in memory 120. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 170) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Client computing device 190 can be, for example, and without limitation, a desktop computer, laptop computer, or tablet computer. Client computing device 190 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 112 for execution. Such a medium may take many forms, including, but not limited to, non-volatile media and volatile media. Non-volatile media include, for example, optical disks, magnetic disks, or flash memory, such as data storage device 126. Volatile media include dynamic memory, such as memory 120. Transmission media include coaxial cables, copper wire, and fiber optics, including the wires that comprise bus 124. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more," All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate aspects can also be implemented in combination in a single aspect. Conversely, various features that are described in the context of a single aspects can also be implemented in multiple aspects separately or in any suitable subcombination. Moreover, although features may be described above as acting in certain combinations and even initially claimed as such, one or more features from a claimed combination can in sonic cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous, Other variations are within the scope of the following claims.

These and other implementations are within he scope of the following claims.

What is claimed is:
1. A computer implemented method comprising:
receiving, at a first device, a discovery message from a second device;
based on the discovery message, establishing a communication channel between the first device and the second device;
receiving, at the first device, identity information from the second device, the identity information including a public portion of an identity key and one or more of: a trusted platform module (TPM) endorsement key certificate, one or more platform control register (PCR) values or a quote of the PCR values with the identity key;
verifying, at the first device, one or more of the PCR values, the quote or the endorsement key certificate; and
based on the verification, sending, from the first device to the second device, a message including a signing key, wherein the signing key includes a random value generated by the first device;
encrypting, at the first device with an endorsement public key, a combination of identity key information and the signing key;
providing the encrypted combination from the first device to the second device;
when a response is received from the second device at the first device after the providing, verifying a signature included in the response; and
authenticating one or more of the communication channel or the identity information from the second device based on the verification of the signature, thereby allowing peer to peer attestation between the first and second devices.

2. The method of claim 1, wherein the TPM endorsement key certificate is provided by a manufacturer of the second device.

3. The method of claim 1, wherein the endorsement key certificate is verified against a list of valid endorsement root authorities stored at the first device.

4. The method of claim 1, wherein the combination is a data structure readable by a TPM at the first device or the second device.

5. The method of claim 1, wherein the signing key is recovered from the encrypted combination by the second device when a TPM of the second device includes private keys for the endorsement public key and the identity key.

6. The method of claim 5, wherein the response is received from the second device when the second device is able to recover the signing key from the encrypted combination.

7. The method of claim 1, wherein the response from the second device includes the signature of the encrypted combination using the signing key, the signing key recovered by the second device.

8. A non-transitory machine-readable medium comprising instructions stored therein, which when executed by a processor, causes the processor to perform operations comprising:
  receiving, at a first device, a discovery message from a second device;
  based on the discovery message, establishing a communication channel between the first device and the second device;
  receiving, at the first device, identity information from the second device, the identity information including a public portion of an identity key and one or more of: a trusted platform module (TPM) endorsement key certificate, one or more platform control register (PCR) values or a quote of the PCR values with the identity key;
  verifying, at the first device, one or more of the PCR values, the quote or the endorsement key certificate; and
  based on the verification, sending, from the first device to the second device, a message including connectivity information associated with the established communication channel, wherein the connectivity information includes a random value generated by the first device;
  encrypting, at the first device with an endorsement public key, a combination of the connectivity information and identity key information;
  providing the encrypted combination from the first device to the second device;
  when a response is received from the second device at the first device after the providing, verifying a signature included in the response; and
  authenticating one or more of the communication channel or the identity information from the second device based on the verification, thereby allowing peer to peer attestation between the first and second devices.

9. The machine-readable medium of claim 8, wherein the TPM endorsement key certificate is provided by a manufacturer of the second device.

10. The machine-readable medium of claim 8, wherein the endorsement key certificate is verified against a list of valid endorsement root authorities stored at the first device.

11. The machine-readable medium of claim 8, wherein the combination is a data structure readable by a TPM at the first device or the second device.

12. The machine-readable medium of claim 8, wherein the signing key is recovered from the encrypted combination by the second device when a TPM of the second device includes private keys for the endorsement public key and the identity key.

13. The machine-readable of claim 12, wherein the response is received from the second device when the second device is able to recover the connectivity information from the encrypted combination.

14. The machine-readable medium of claim 8, wherein the response from the second device includes the signature of the encrypted combination using the connectivity information, the connectivity information recovered by the second device.

15. A system comprising:
  a memory comprising instructions; and
  a processor configured to execute the instructions to:
    receive, at a first device, a discovery message from a second device;
    based on the discovery message, establish a communication channel between the first device and the second device;
    receive, at the first device, identity information from the second device, the identity information including a public portion of an identity key and one or more of: a trusted platform module (TPM) endorsement key certificate, one or more platform control register (PCR) values, a public portion of an asymmetric signing key, a signature of the public portion of the asymmetric signing key by the identity key, or a quote of the PCR values with the identity key;
    verify, at the first device, one or more of the PCR values, the quote, the endorsement key certificate or certification of the asymmetric signing key; and
    based on the verification, send, from the first device to the second device, a message including a signing key, wherein the signing key includes a random value generated by the first device;
    encrypt, at the first device with an endorsement public key, a combination of identity key information and the signing key;
    provide the encrypted combination from the first device to the second device;
    when a response is received from the second device at the first device after the providing, verify a signature included in the response; and
  authenticate one or more of the communication channel or the identity information from the second device based on the verification of the signature, thereby allowing peer to peer attestation between the first and second devices.

16. The system of claim 15, wherein the first device retains the asymmetric signing key along with other metadata for the second device to authenticate future connections to the second device.

17. The system of claim 15, wherein the endorsement key certificate is verified against a list of valid endorsement root authorities stored at the first device.

18. The system of claim 15, wherein the combination is a data structure readable by a TPM at the first device or the second device.

19. The system of claim 15, wherein the signing key is recovered from the encrypted combination by the second device when a TPM of the second device includes private keys for the endorsement public key and the identity key.

20. The system of claim 19, wherein the response is received from the second device when the second device is able to recover the connectivity information from the encrypted combination.

\* \* \* \* \*